United States Patent
Cheng

(10) Patent No.: US 7,415,922 B2
(45) Date of Patent: Aug. 26, 2008

(54) GRILL PAN

(75) Inventor: Stanley Kin Sui Cheng, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 161 days.

(21) Appl. No.: 11/083,663

(22) Filed: Mar. 18, 2005

(65) Prior Publication Data

US 2005/0204931 A1 Sep. 22, 2005

Related U.S. Application Data

(60) Provisional application No. 60/554,734, filed on Mar. 19, 2004.

(51) Int. Cl.
*A47J 37/00* (2006.01)
(52) U.S. Cl. .............. 99/425; 99/422; 99/445; 99/446
(58) Field of Classification Search .......... 99/339, 99/340, 422–425, 375, 400–401, 444–450; 126/348, 369
See application file for complete search history.

(56) References Cited

U.S. PATENT DOCUMENTS

| 175,067 A * | 3/1876 | Gates ............ 99/445 |
| 199,822 A * | 1/1878 | Geyser ........... 99/445 |
| 264,867 A | 9/1882 | Ege |
| 265,608 A * | 10/1882 | Johnston ........ 99/445 |
| 389,602 A | 9/1888 | Sankey |
| 472,537 A * | 4/1892 | Griswold et al. ...... 99/445 |
| 640,030 A * | 12/1899 | Rietzke ........ 99/445 |
| 676,479 A | 6/1901 | Wagner |
| 850,654 A | 4/1907 | Jones |
| 1,625,731 A | 4/1927 | Lee |
| 1,733,450 A * | 10/1929 | Detwiler ........ 99/340 |
| 5,211,105 A | 5/1993 | Liu |
| 5,259,299 A * | 11/1993 | Ferraro ........ 99/340 |
| 5,983,786 A | 11/1999 | Brown |
| 6,087,643 A | 7/2000 | Cook et al. |
| 6,363,842 B1 | 4/2002 | Lin |

FOREIGN PATENT DOCUMENTS

DE 3128944 A1 * 9/1983

\* cited by examiner

*Primary Examiner*—Timothy F. Simone
(74) *Attorney, Agent, or Firm*—Edward S. Sherman

(57) ABSTRACT

A grill surface or pan provide for the removal of fats and oils by supporting the foodstuffs on ribs that slope downward such that the intervening regions form channels for transporting fluids to the edge of the pan, and away from the cooking food stuffs. The draining channels are interrupted by intervening ribs of a lower height than the first set of foodstuff supporting ribs. The intervening ribs have a series of slits or holes formed in there apex to enable the direct cooking of the foodstuff by radiant heat from a flame or heating source disposed underneath the grill surface. The grill surface may be combined in a pan that provides a peripheral fluid collecting channels at the termination or junction of the draining channels disposed between the sets of rib food supporting and slotted or perforated ribs.

45 Claims, 9 Drawing Sheets

GRILL PAN

CROSS REFERENCE TO RELATED APPLICATIONS

This application claims priority from U.S. Provisional Patent Application Ser. No. 60/554,734, filed Mar. 19, 2004, the disclosure of which is incorporated herein by reference in its entirety.

BACKGROUND OF INVENTION

The present invention relates to improved surfaces and pans for grilling foods.

Prior methods of grilling foods involve either pacing food on a wire mesh over an open flame, or a cooking at high temperatures in enclosed pan, the pan having a series of ribs for searing the food in contact therewith, emulating in part the action of the wire mesh in open flame cooking. In the former case fat and liquid is removed from the foods by dripping through the mesh into the flame. In the latter case of pan grilling, the ribs or pan surface is situated to drain the fat away from the food being cooked, lest it reach the level of the supporting ribs and simmer rather than sear the food surface.

Open flame cooking is generally limited to outdoor cooking, as special venting is needed to exhaust the smoke and flames produced by burning fat. However, certain foods are particularly difficult to cook over an open flame. High fat foods, such as hamburgers and chicken, can produce so much liquid fat that the open flame flares up to burn or deposit soot onto the food, unless it is constantly moved or flames are constantly reduced with a water spray.

Grilling pans are frequently deployed in outdoor use to provide removable, washable cooking surface, as opposed to a grid that is very large or permanently installed on a barbeque or fire ring. Such outdoor grill pans, in order to achieve direct radiant heating have openings of some sort on the bottom, For example, they can be formed from closely spaced wires, and can take the form of a basket for retaining and even tossing particular foods, or a slat sheet of metal having a sequence of holes punched therein. Such grill pans with a closer spacing of wires or smaller holes make it easier for the cook to prepare and remove the delicate food from the grill surface with spatula as well as avoid dropping it through the opening in the larger grill surface, which would not support the grill pan. However, such grill pans do not prevent the burning of foods if the cook is not alert and ready to move the pan as dripping grease cause large flares. Alternatively, when such pans utilize a flat surface, to facilitate the removal and turning of delicate food with a spatula, the holes are readily clogged by the food, and hence the food is more likely to be at least partially braised in liquid rather than seared.

Grilling pan for indoor use are known, and frequently deploy sloping channels between supporting ribs to effectively drain the fat and liquid generated during cooking away from the food. However, such grill pans do not achieve the flavor of open flame cooked foods, even when used under an oven broiler, as some burning and sizzling of the fat in an open flame flavors the meat.

One such grill pan which attempts to expose meat to an open flame while draining away at least a portion of the fat or dripping juices as taught in U.S. Pat. No. 1,625,731, issued Apr. 19, 1927. The patent discloses a cooking utensil generally used with an upper and lower grid member. The lower grid member has a surrounding trough for collecting fat drained from slot channels in the upper and lower grid member. Ribs for supporting the meat or other food separate the channels. Slots are formed between the ribs, allowing allowing flame to pass to the upper grid and the meat or food being cooked. The slots are placed between the ribs. The lower grid is oriented with respect to the upper grid channels such that some of the juices will drip to the slots in the lower grid. The patent discloses that a single grid may be deployed instead of the double grid. However, in either case a considerable quantity of fat is liable to drip out through the slots, if they are oriented to allow direct expose to the flame.

It is therefore a first object of the present invention to provide an improved grilling surface for open flame cooking, which supports delicate foods, yet prevent burning from excess fat dripping into the fire, while at the same time giving the desired flavors of barbeque grill cooking.

It is another object of the invention to provide a pan for indoor grilling that drains the majority of the fat from food without burning, yet allows some flavoring to occur without the need for special exhaust equipment to remove the smoke produced.

SUMMARY OF INVENTION

In the present invention, the first object is achieved by providing a grilling pan having intervening sequences of elevating ribs that are tilted slightly such that an intervening channel drains toward a large fat or grease collecting channel at the edge of the pan. At least some of the ribs have holes or slits formed in them to provide direct or radiant cooking from the flame or other heating source below the grilling pan. By disposing the slits or holes on ribs that are slightly below adjacent ribs that are solid, most of the fat is drained away, while a minor portion escapes through the slits and enhances the flavor of the foodstuffs cooked thereon.

Other objects are achieved by a close spacing of the ribs and altering the placement and number of slits in the ribs to accommodate a range of indoor ranges and outdoor grills, barbeques that utilize diverse heat sources.

The above and other objects, effects, features, and advantages of the present invention will become more apparent from the following description of the embodiments thereof taken in conjunction with the accompanying drawings.

BRIEF DESCRIPTION OF DRAWINGS

FIGS. 4C, D and F illustrate the function of the ribs and intervening channels for draining fat from the cooking foodstuffs.

DETAILED DESCRIPTION

Figure 1:
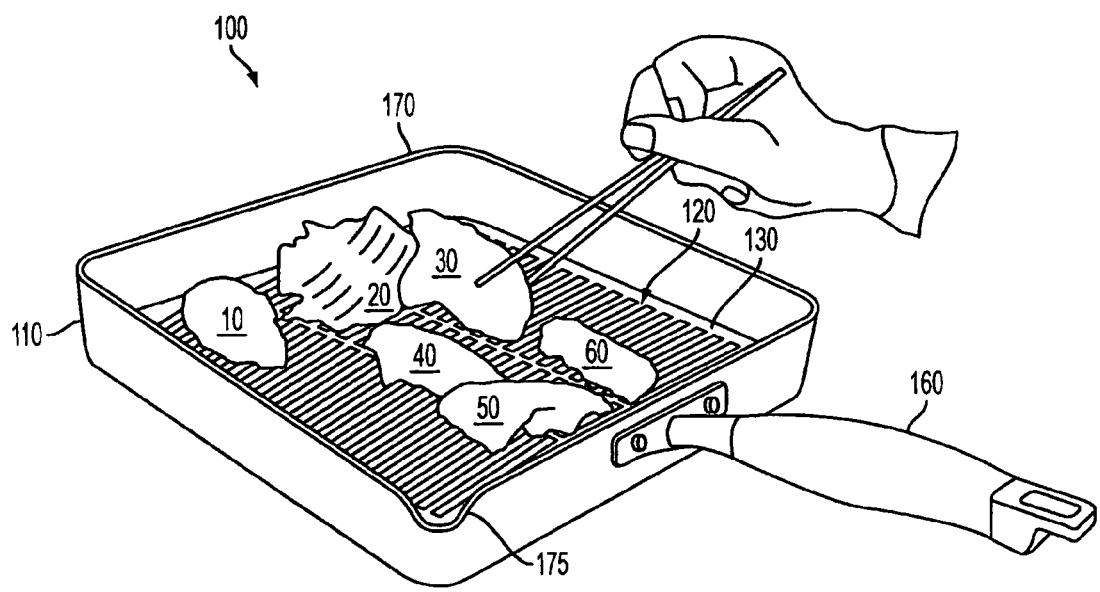
FIG. 1 is a perspective view showing a first embodiment of the grill pan in use for preparing a variety of foodstuffs.

In accordance with the present invention, FIG. 1 is a perspective view showing a first embodiment of a grilling pan in use while the chef is preparing a variety of foodstuffs. The foodstuffs 10, 20, 30, 40, 50 and 60 are disposed on the supporting grill section 120 of grill pan 100. An attached and integral fat or grease-collecting channel 130 surrounds grill section 120. Substantially vertical walls 110 that form the perimeter of the grill pan in turn surround channel 130. The grill pan is readily moved about via handle 160, which in turn is attached to vertical wall 110. The grill section 120 includes a series of support ribs that slope downward from an apex or ridge in the top of grill section 120. The ribs are oriented parallel to the slope formed in grill surface 120 such that the intervening regions between the ribs form a series of parallel channels for draining liquids into the surrounding collecting channel 130. Grill pan 100 also includes a pouring spout 175 formed in rim 170 and disposed at a corner of wall adjacent handle 160. The pouring spout 175 aids in the periodic removal of grease, fat or oil collected in channel 130.

Grill section 120 is subdivided into two sides, each, which meet at a common or higher ridge bisecting grill pan 100 and disposed perpendicular to the major axis of handle 160.

Figure 2:
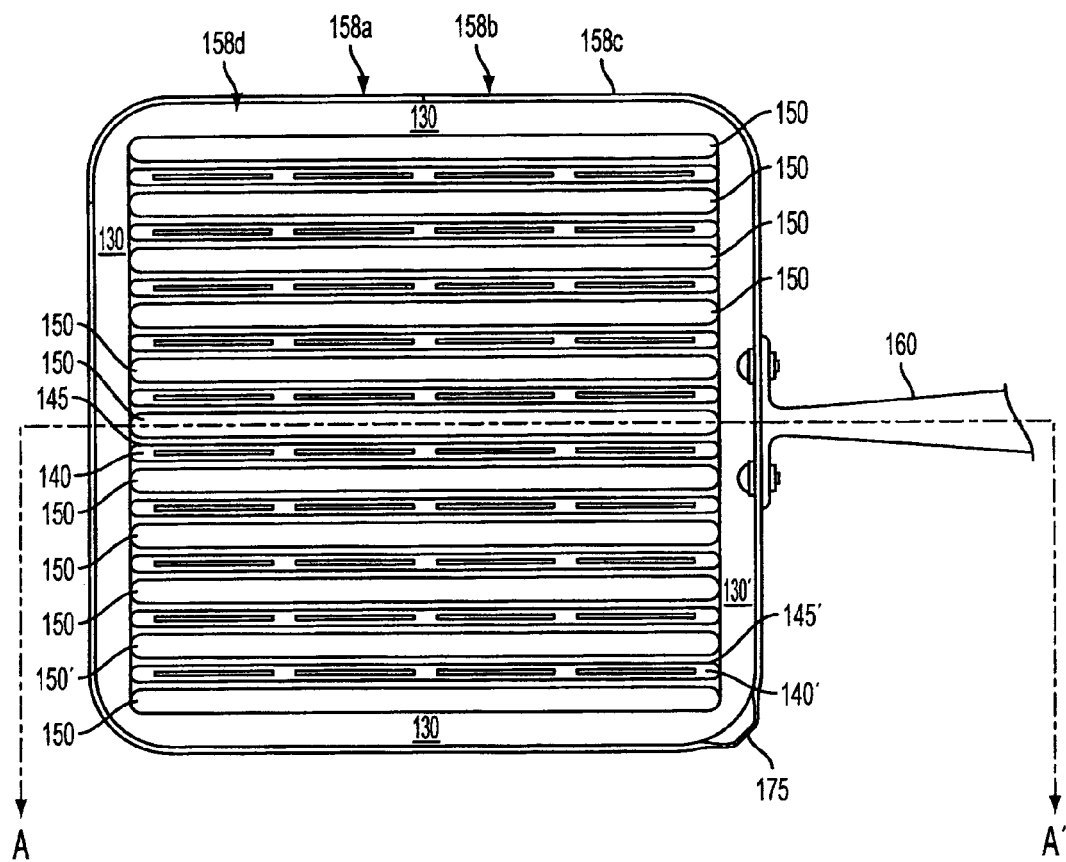
FIG. 2 is plan view of the grilling pan of FIG. 1
Figure 3:
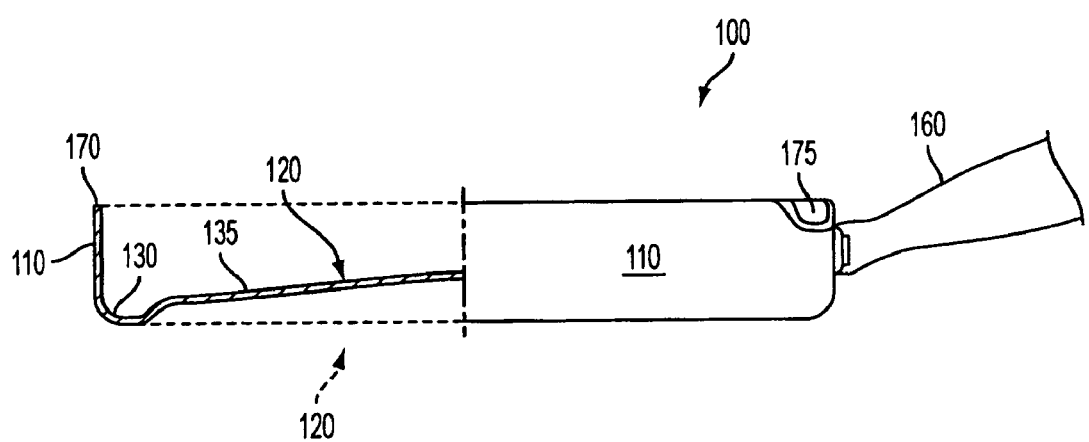
FIG. 3 is elevation through section line A-A' in FIG. 2, showing a partial cross-section of the grill pan as well as an external elevation that includes a portion of the handle.

FIG. 2 is plan view of the grilling pan of FIG. 1, which along with the elevations and sections in FIGS. 3 and 4 illustrate further the operative function and benefits of the various rib structures that form grill section 120. Ribs 140, which are disposed in alternation between foodstuff-supporting ribs 150, have slits 144 disposed parallel to the longitudinal axis of each rib, being situated on the apex 146 thereof. As shown in FIG. 2, the slits generally do not extend the full length of rib 140, but are subdivided into four sections, 2 two on each half of the grill section of the pan, so as not to structurally weaken the grill pan. That is, ribs to the right of side of the pan 100 have columns 158b and 158c of slits on the ribs 140' that slope downward with draining channels 145' toward collecting channel portion 130'. Ribs 140 to the left of side of the pan 100 have columns 158a and 158d of slits on the ribs 140 that slope downward with draining channels 140 toward collecting channel portion 130.

FIG. 3 is an elevation through line A-A' in FIG. 2, showing a partial cross-section of the grill pan. At the left side of the pan in FIG. 3, section line A-A' initially runs through the apex of supporting rib 150 which is separated from adjacent rib 140 by an intervening draining channels 145. Thus, referring back to FIG. 3, it can be seen that the left portion of grill section 120 slopes downward from the horizontal axis toward channel 130 with, in this embodiment, the highest point on grill section 120 being at the center of the pan in this embodiment, but preferably below the height of rim 170.

Figure 4A:
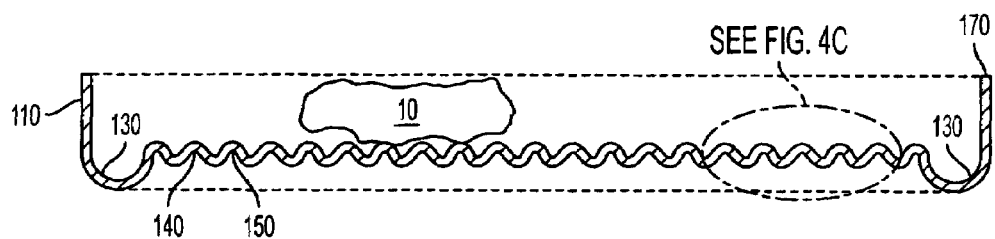
FIG. 4A is a cross sectional elevation orthogonal to the elevation in FIG. 3
Figure 4B:
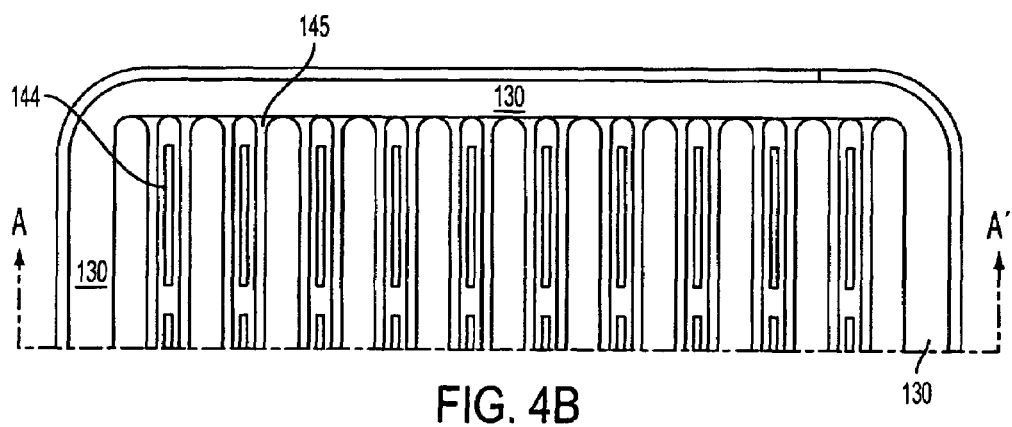
FIG. 4B is a plan view of a limited portion FIG. 2 to highlight the corresponding features and detailed construction of the grilling ribs in FIG. 4A.

FIG. 4A is a cross sectional elevation orthogonal to the elevation in FIG. 3 in order to illustrate the preferred profile of supporting rib series 150 and the second set of ribs 140, along with intervening draining channels 145. By referring to FIG. 4B, a corresponding portion of the plan view in FIG. 2 to FIG. 4B, the lateral dimension of the rib and draining channels will be apparent. It should be appreciated that rim 170 extends about 25 to 35 mm above grill section 120, with channel 130 having a depth of about 10 mm below the lowest portion of the grill section 120 at junction 135. This configuration of ribs and intervening draining channels is operative to direct liquid rendered from the cooked foodstuffs to collecting channel 130. That is liquid will flow as droplets or streams toward channel 130 via the sequence of draining channels 145 disposed below and between the set of foodstuff supporting ribs 150 and a second set of ribs 140.

Figure 4C:
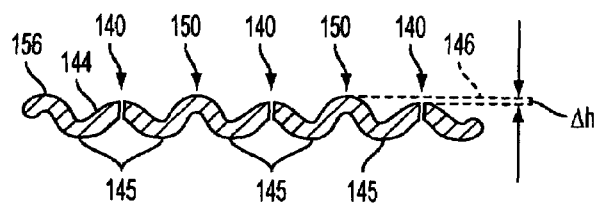
FIG. 4C is an expanded view of a portion of the cross section in FIG. 4A illustrating the distinctions between the alternating series of ribs.

FIG. 4C is a detailed view of the encircled portion of the cross section in FIG. 4A, illustrating the distinctions between the alternating series of ribs. The spacing between the apex 146 of ribs 140 and the apex 156 of ribs 150 is about 12 mm, while the depth of the draining channel, as measured from the apex 156 of ribs 150, is about 4 to 6 mm. The difference in height, Δh, between the apex 146 of ribs 140 and the apex 156 of ribs 150 is about 1 to 2 mm.

Figure 4D:
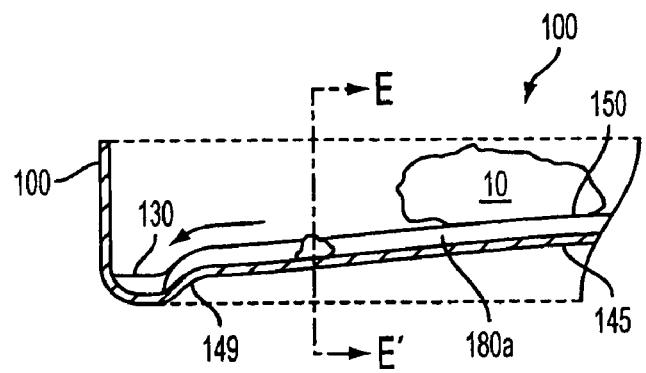
Figure 4E:
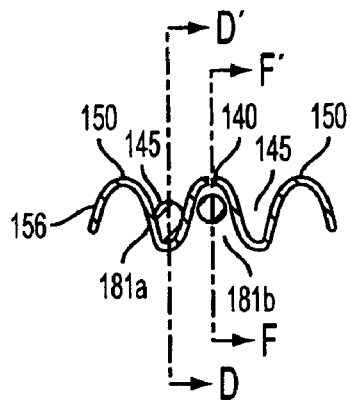

FIG. 4D. E and F illustrate the function of the ribs and intervening channels for draining fat from the cooking foodstuffs. FIG. 4E is a cross-sectional elevation showing the profile of the foodstuff supporting ribs 150 and the intervening ribs 140 along. Section marker D-D' refers to the orthogonal section in FIG. 4D whereas section marker F-F' refers to the orthogonal section in FIG. 4F. FIG. 4E represents the orthogonal section defined by section marker E-E' in FIGS. 4D and 4F, as it bisects droplets 181a (in FIG. 4D) and droplet 181b (in FIG. 4D). The apex 156 of the foodstuff supporting ribs 150 are about 1 to 2 mm higher than the adjacent and intervening set of ribs 140 that include longitudinal slits 144. As the spacing between the nearest set of the higher ribs 150 is about 24 mm, most foodstuff will be suspended above slits 144 of ribs 140. Thus as illustrated in FIG. 4D liquids, such as fats, oils and grease rendered from the foodstuff 10, will tend to wick or flow with the aid of gravity from the surface of the food to the foodstuff supporting ribs 150 at their point of mutual contact. Such liquid will first flow into draining channel 145, forming droplets 180a. As the draining channels slope downward at an angle of about 5 to 15 degrees from the horizontal, droplet 180a will continue to flow downward into collecting channel 130. As the bottom of drainage channel 145 is about 3 to 5 mm below the apex 146 and slits 144 in ribs 140, liquid will generally not enter slits 144. Thus, with most of the liquid or fat is directed away from slits 144, minimizing the propensity of foodstuffs to drip fat onto an underlying radiant heating element, such as a flame or charcoal. Further, by draining fat away from the ribs 140 slit s 144 remain open as apertures for radiant energy to cook the portion of the foodstuff spanning adjacent ribs 150.

Figure 4F:
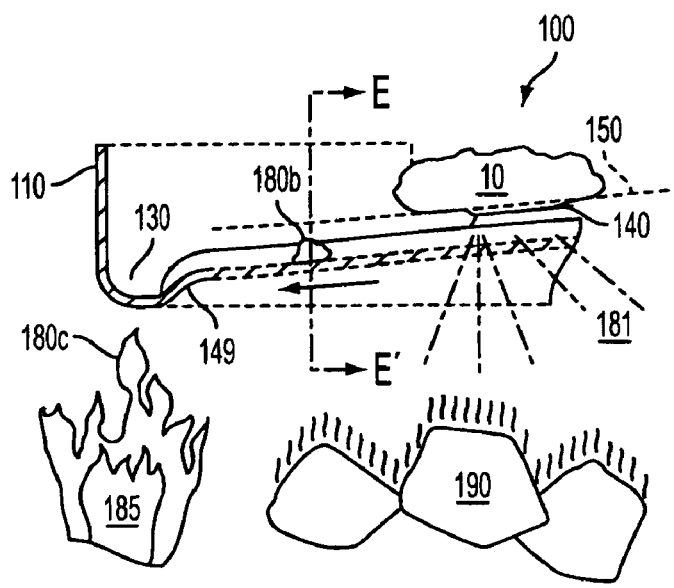

Further, as shown in FIG. 4F, when most meats are subjected to high heat they eject micro droplets of fat 181 as they sizzle, some of the fat does pass through the slits and reaches the flame or equivalent heating element 190. However, the quantity of fat will generally be reduced for most foodstuffs to avoids flare ups on the grill, but also be sufficient to generate the desirable flavoring of meat cooked over and open flame caused by the smoke that permeates the food via slits 144. While some liquid fat or oil can and does drip from the meat directly on the slit opening 145, a substantial portion still drains away from the cooking foodstuff. FIG. 4D illustrates this phenomena in which a droplet 189b while held by surface tension to the underside of slit 145 is wicked by gravity toward the lower outside edge of the cooking surface at region 149. Although some portions of the rendered fat or oil will eventually drip downward from the bottom of the pan at 149, as shown at droplet 180c, the flames 185 that forms is now at the periphery of the pan, and hence will not burn or deposit soot on foodstuff pieces 10, disposed toward the center of pan 100.

Figure 5A:
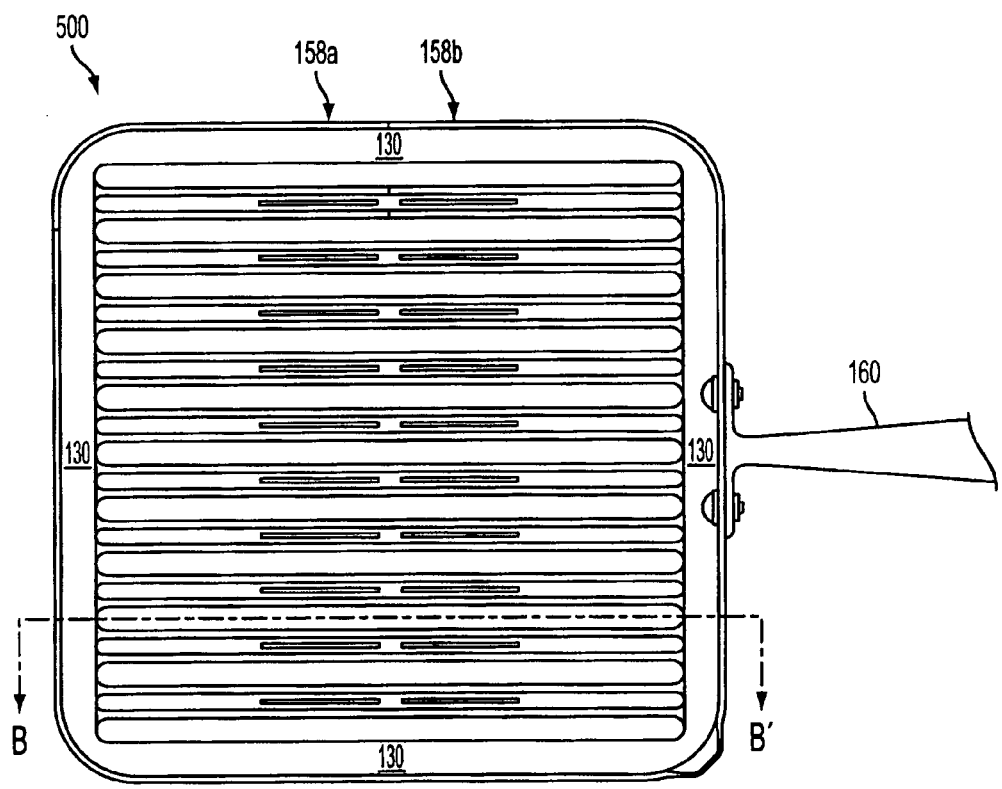
FIG. 5A and FIG. 5B are a plan view and cross-sectional elevation respectively of an alternative embodiment of the invention.
Figure 5B:
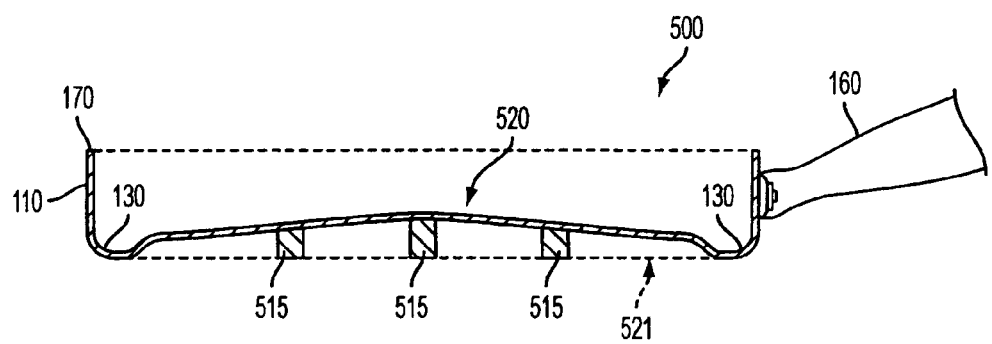

FIG. 5A and FIG. 5B are plan views and cross-sectional elevations respectively of an alternative embodiment of the invention intended for cooking indoors. The slits 145 in ribs 140 are now limited to two columns 158a and 158b, which minimizes the dripping or spattering of fats from the foodstuffs to the region below the grill pan, where they would then reach or be consumed by the flame or equivalent heating element. Using grill pan 500 the cook can selectively use the portion of the pan with or without slits 145 in ribs 140 according to the nature of the heat source and the propensity for the food to render or spatter fat or liquids. That is, the cook can selectively place specific foods over the slit portion of the ribs when a less fat will be released, either because of the nature of the food, or by initially rendering a significant portion of the fat by first cooking on the portion of the surface that is devoid of slits. Further, as grill pan 500 might not be sufficiently stable if the non-planar bottom of grill section 520 where larger than the flat burner ribs or pan supports on some commercial stovetops, a series of three support ribs 515 (shown in the elevation in FIG. 5B) are disposed to span the bottom portion 521 of grill section 520, extending from the bottom to the top sides of the grill pan 500 as depicted in the plan view in FIG. 5A.

Figure 6A:
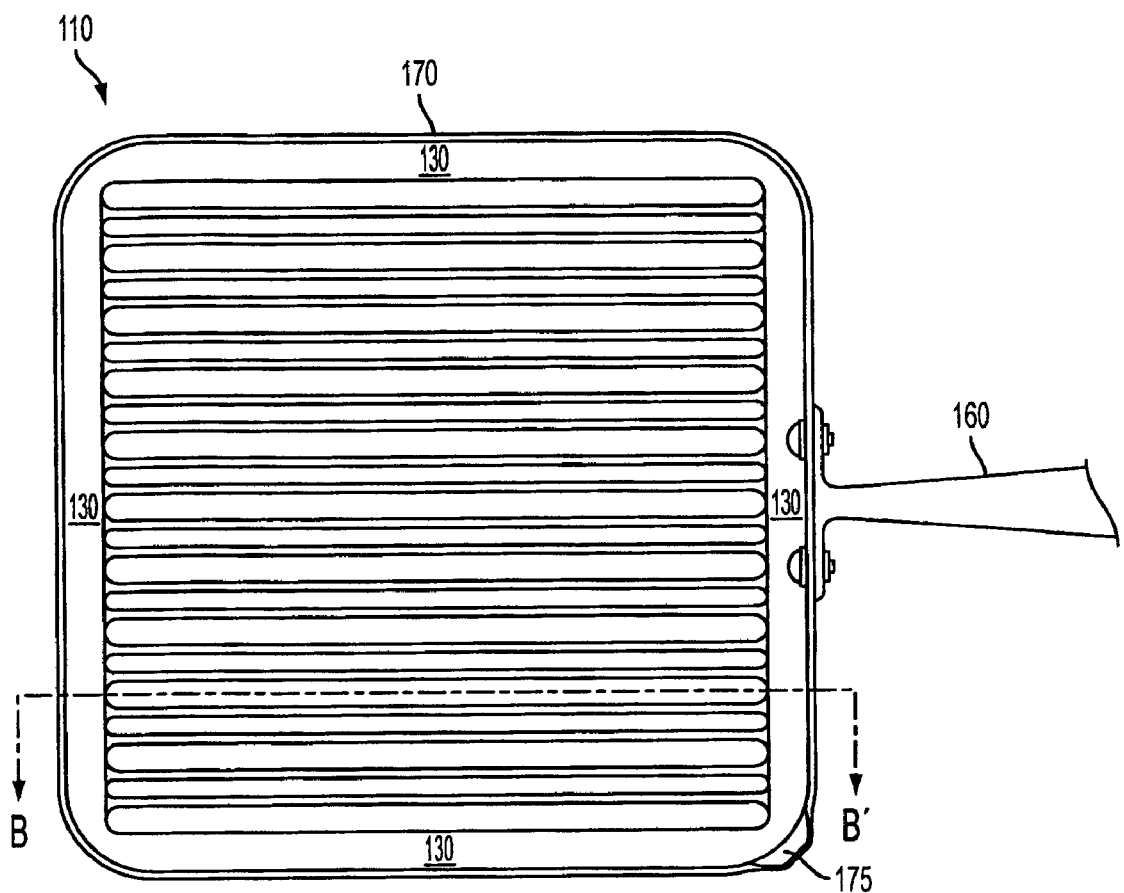
FIG. 6A and FIG. 6B are a plan view and cross-sectional elevation respectively of another embodiment of the invention.
Figure 6B:
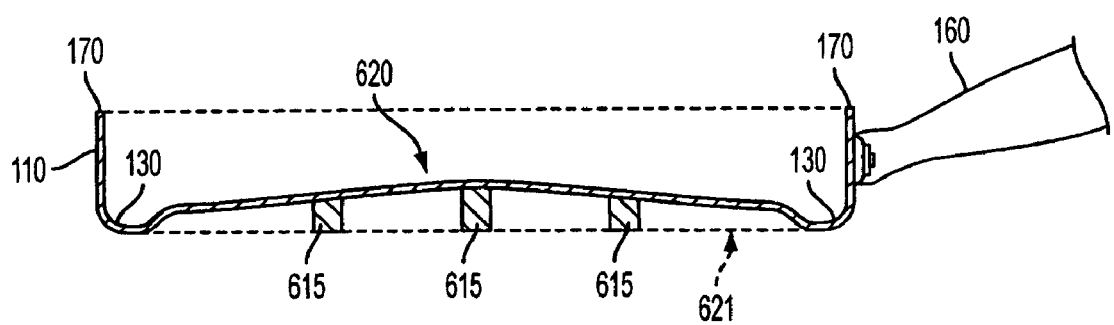

FIG. 6A and FIG. 6B are a plan view and cross-sectional elevation respectively of another alternative embodiment of the invention. This embodiment is intended for cooking indoors when it is the intention of the cook to avoid any of the dripping or spattered fats and oils from the food to reach or be consumed by the flame or equivalent-heating element. Grill pan 600 also includes a series of support ribs 615, which are disposed to span the bottom portion 621 of grill section 620, providing support on a variety on a wide variety of stove tops.

It should be appreciated that other alternative embodiments, wherein the slits are placed over only a portion of the pan are also possible, and intended to be embraced by the scope of the invention. For example, the four columns of slits 158a-d in FIG. 2, may be deployed on less than half of the pan, such as the upper half distal from the side having handle 160, with the half closest to the handle being used for indoor cooking or rendering fat in the initial stages of cooking. Like the pan shown in FIG. 5, such a grill pan is suitable for both outdoor use as well as a variety of indoor uses.

Figure 7:
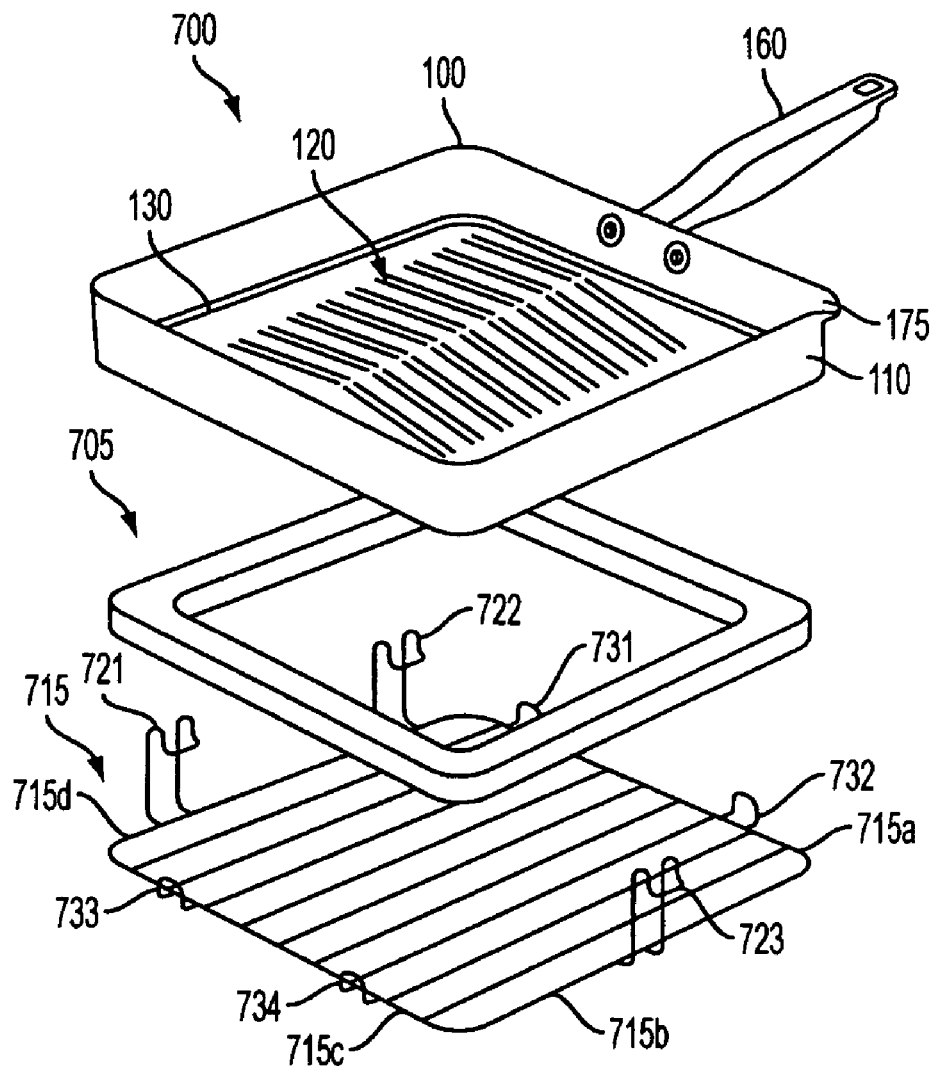
FIG. 7 is an exploded perspective view showing the cooperative assembly of accessory components of an additional embodiment of the invention.

It should be appreciated that although the presently preferred width of slits 144 is about 2.1 mm, the width can be increased, or the spacing or height of the ribs decreased such that the cooking foodstuff is more directly exposed to radiant heat through a correspondingly larger aperture. Generally, it is desirable that the width of the slit is at least about 1.5 mm, but less than about 3 mm to avoid excess drainage or dripping of juice or fat through the slits. As increasing the effective aperture of the slits can result in an increase in fat and cooking oils that will reach the flame or heating element, a further embodiment, shown in FIG. 7, may be preferred by some cooks. The apparatus, shown in an exploded perspective view in FIG. 7, provides for the capture of such dripping fat before it reaches the radiant heating element in a trough frame 705. An external trough frame 705 is coupled to the bottom of the pan 100 via grid 715. The top of grid 715 urges the bottom of trough 705 upward into contact with the bottom of grill 100 such that the trough opening spans over the inside edge of the channel portion 130, as well as drip point 149 (in FIG. 4F). Grid 705 includes a plurality of vertical extending attachment clips 721, 722 and 733 attached to grid edges 715b and 715c. The vertical extending attachment clips have a vertical section that spans the combined height of the grill pan 100 and the trough frame 705 such that a head or inward extending horizontal section can secure the top of the grill pan 100 by rim 170. In order to complete the assembly prior to cooking, the vertical extending attachment clips 721, 722 and 733 are flexed to permit the head thereof to fit over the rim 170 of grill pan 100. The flexed attachment clips are and then released after the trough frame 705 is secured under grill pan 100, and removed in the reverse process. Further, two pairs of inverted U shaped wire frames extend from each of the two adjacent sides 715c and 715a of grid 714, that prevent the grill pan 100 and trough frame 705 from separating in the lateral direction transverse to sides 715b and 715c. Inverted U shaped wire frames 731 and 732 are disposed on the side or grid edge 715a, while inverted U shaped wire frames 733 and 734 are disposed on side or grid edge 715d. In a preferred method of use, some water is placed in external trough frame 705 before cooking in order to cool the liquid fat and prevent it from burning or flashing over. This embodiment further enables and extends the indoor use of any pan configuration with slits, as trough frame 705 will collect some of the excessive fat that would drip from the bottom of the pan.

Figure 8:
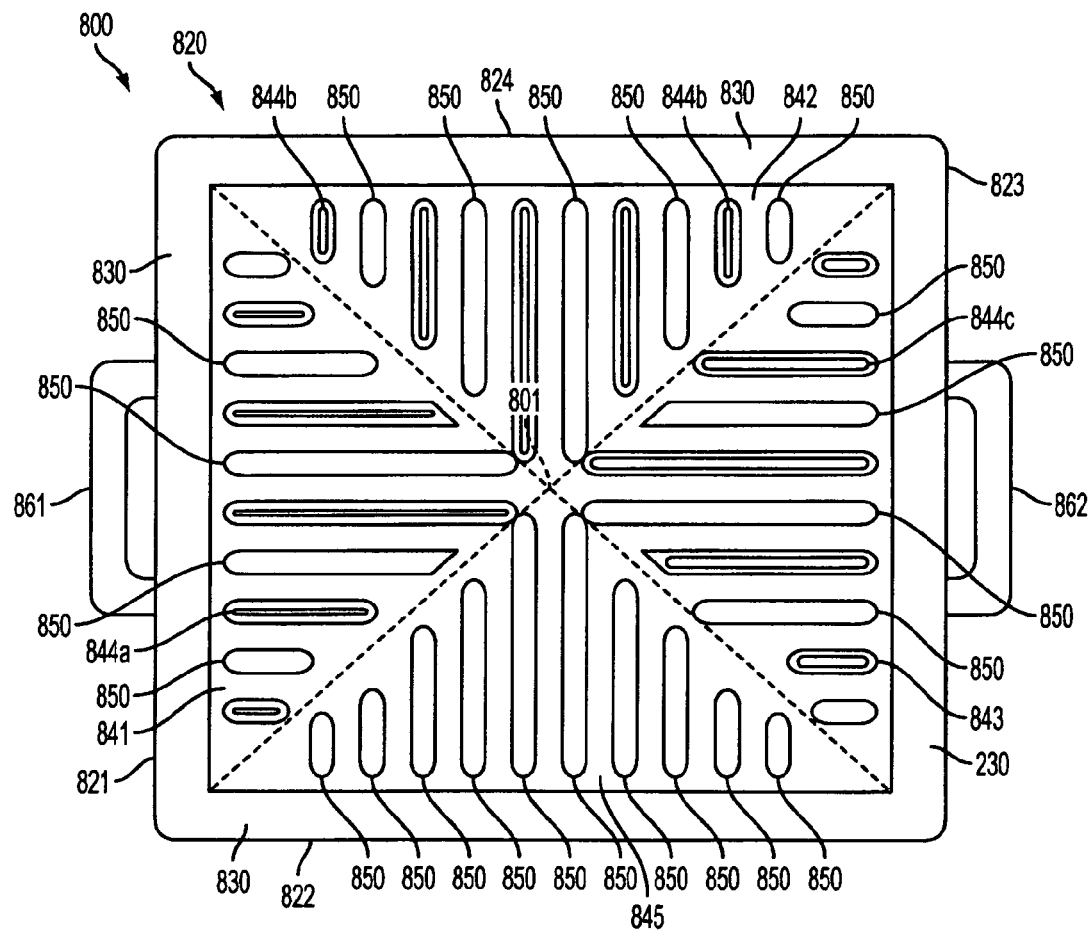
FIG. 8 is a plan view of another embodiment of the invention.

FIG. 8 is a plan view of another embodiment of the invention in which grill pan 800 has two handles 861 and 862 disposed at opposite sides. The grilling section 820 is subdivided into four sections or quadrants 821, 822, 823 and 824, each having a triangular shape with a long side adjacent a common fat or grease collecting channel 830. Thus, the grill section 820 has an apex 801 where all four quadrants meet. The ribs in each quadrant are disposed perpendicular to the adjacent edge of the pan to drain toward the adjacent section of fat or grease collection channel 820 as the quadrants slope downward from apex 801. While each section deploys a series of higher elevated ribs 845, the intervening series or set of ribs that include a longitudinal slit vary from quadrant to quadrant. Specifically, the drawing is intended to illustrate that the width or dimensions of the slit vary from quadrant to quadrant. Specifically, quadrant 821 has a sequence of ribs 841 that are lower than ribs 850 and have a narrow slit 844a, whereas quadrant 824 has a sequence of ribs 842 that are lower than ribs 850 and have a wider slit 844b than sequence 841, with quadrant 823 having the widest slit 844c in rib sequences 843. In addition, one quadrant 822 optionally has no slotted ribs. This construction enables the initially cooking of the foodstuff in the quadrant with the most suitable slit aperture dimension to minimize the dripping of fat through the slits, with the progressive movement of food toward a quadrant with larger slit opening as more of the fat is rendered from the food. It is also possible to provide a quadrant or region of the grill surface that has entirely slotted ribs or a simple grill opening between solid ribs as in a conventional grill. Thus, as fat is progressively removed from pieces of food, the food is moved to provide greater areas for radiant heating.

To the extent the cook wishes to more completely avoid the possibility of excessive burning of fat and smoke generation in their kitchen (as well as the deposition of fat and grease on the stovetop) the apparatus of FIG. 7 is preferably deployed with the grill pan 800 in FIG. 8. It may also be deployed with similar grill pans that also have some or all of the slits 144 terminate adjacent to the fat collecting trough 130. Preferably, the slits terminate such that all the ribs are solid at a distance of at least an inch (25 mm) away from fat or grease collecting channels. Such alternative grill pans also embrace embodiments wherein all the slits 144 are the same width, or the slits are disposed only adjacent to collecting trough 130, the center of the pan being devoid of slits.

It should also be understood that the beneficial construction and features of the grill sections described above can be deployed without the cooperative inclusion of a collecting channel and surrounding pan, for example as the grid for an outdoor barbeque, or even commercial or other gas grills intended for indoor use.

It should be understood that the definitions of ridges and channels is a relative term, as the term channels should be understood to mean a valley or region between food supporting structure such as ridges. The term elongated ridges refers to the layout of the ridges or a series of higher regions above such valleys in accordance through which liquids flow downward through the valleys via gravity.

It should be further understood that the definition of slits is also a relative term to denote that a series of one or more holes are arranged in sequences following the channel shape, but rising above the bottom of the channels such that liquefied fat flowing down the channel generally does not enter the hole. While the preferred shape of such slits is as a sequence of two or more high aspect ratio apertures disposed at the apex of ridges, such holes or a sequence of holes can be disposed at any location sufficient above the fluid draining valleys. Accordingly, in such arrangements the food stuffs are exposed to radiant heat of the flame, but that liquids collected in the valleys will not flow into the slits or holes, and then into the flames.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims. Such equivalents include, without limitation, variations in the shape or outer dimension of the grill pan, such as a round, oval or rectangular pan and the like. Other equivalents include variations in the orientation of the sloping sections of the grill section, with each of the one or more sections sloping downward toward a common or multiple fat or grease collecting channels disposed at the edge of the pan and surrounding the grilling section.

The invention claimed is:

1. A grilling surface comprising:
   b) a sequence of elongated food supporting ribs, each rib having an apex,
   c) a sequence of channels disposed between each of said supporting ribs and disposed at an angle from the horizontal to drain fat away from food supported by the ribs during cooking,
   d) wherein at least a of portion of said supporting ribs comprise one or more apertures disposed on the apex of ribs and above the bottom of the adjacent channel, wherein the apex of the ribs at said one or more apertures is disposed below a reference plane defined by the apex of the intervening ribs not comprising said one or more slits.

2. A grilling surface according to claim 1 wherein said sequence of elongated food supporting ribs is disposed at an angle from the horizontal so as to drain fat away from food supported by the ribs during cooking.

3. A grilling surface according to claim 1 wherein said apertures are slits oriented substantially parallel to the direction of said elongated ribs.

4. A grilling surface according to claim 3 wherein at least a portion of the one or more apertures have an aspect ratio greater than 1.

5. A grilling surface according to claim 1 wherein the apertures have a width from about 1.5 mm to about 3 mm.

6. A grilling surface according to claim 4 wherein the apertures have a width of about 2.1 mm.

7. A grilling surface according to claim 1 wherein the apex of the ribs at said one or more slits is disposed below the reference plane defined by the apex of the adjacent ribs not comprising said one or more slits by at least 1 mm.

8. A grilling surface comprising:
   a) a first sequence of two or more elongated ribs, having a top surface,
   b) a second sequence of elongated ribs, wherein substantially all of the ribs in each sequence are disposed between a rib in the other sequence, wherein at least a portion of the top surface of said first sequence of ribs are disposed below the top surface of said second sequence of ribs.
   c) a sequence of channels disposed between each of pair of adjacent supporting ribs of said first and second sequence and disposed at an angle from the horizontal to drain fat away from food supported by the ribs during cooking
   d) wherein at least a portion of said first sequence of supporting ribs comprise one or more apertures disposed on a portion of the first sequence of elongated ribs above the bottom of the adjacent channel, being oriented in the direction of the ribs.

9. A grilling surface according to claim 8 wherein at least a portion of the one or more apertures is disposed on the apex of the first sequence of elongated ribs.

10. A grilling surface according to claim 8 wherein at least a portion of the one or more apertures have an aspect ratio greater than 1 so as to form slits oriented substantially parallel to the direction of said elongated ribs.

11. A grilling surface according to claim 8 in which at least one of said first and second sequence of elongated ribs is disposed at an angle from the horizontal so as to define a first reference plane substantially parallel to a second reference plane defined by said intervening channels.

12. A grilling pan comprising:
   a) a cooking surface, which comprises a first portion having;
      i) a plurality of elongated ribs,
      ii) a sequence of channels disposed between each of the ribs and disposed at an angle from the horizontal to drain fat away from food supported by the ribs during cooking,
   b) a common channel at the periphery of said cooking surface disposed at an elevation to collect fat flowing down the sequence of channels,
   c) a wall extending substantially upright from and surrounding said common channel,
   d) wherein at least a first subset of the plurality of elongated ribs are disposed below the apex of two adjacent ribs on opposite sides, and one or more of said first subset of ribs comprises apertures disposed on the ribs and above the bottom of the adjacent channel.

13. A grilling pan according to claim 12 further comprising a second portion of the cooking surface, the second portion comprising;
   i) a plurality of elongated food supporting ribs,
   ii) a sequence of channels disposed between each of said supporting ribs and disposed at an angle from horizontal to drain fat away from food supported by the ribs during cooking,
   b) wherein the first and second portions of the cooking surface slope away from a common point of intersection proximate the center of the pan whereby juice or fat dripping from food supported on the ribs in each portion drains away from the center of the pan in the opposite directions from juice or fat draining in the other portion such that the fat or juice from both portions is collected in the common channel surrounding each of the first and second portions.

14. A grilling pan according to claim 13 wherein at least a portion of the one or more apertures is disposed on the apex of the elongated ribs.

15. A grilling pan according to claim 12 wherein at least a first subset of the plurality of elongated food supporting ribs in said second portion are disposed below the apex of adjacent ribs, and on one or more of said first subset of ribs of said second portion the apertures are slits disposed on the ribs and above the bottom of the adjacent channel, being oriented in the direction of the ribs.

16. A grilling pan according to 15 wherein the apertures have a different width in each portion of the cooking surface.

17. A grilling pan according to claim 12 wherein at least a portion of the one or more apertures have an aspect ratio greater than about 3.

18. A grilling pan according to claim 12 in which the sequence of elongated food supporting ribs is disposed at an angle from the horizontal so as to define a first reference plane substantially parallel to a second reference plane defined by the channels.

19. A grilling pan according to claim 12 in which said upright wall extends above the surface of the ribs.

20. A grilling pan according to claim 12 further comprising at least one handle attached to and extending outward from said upright wall.

21. A grilling pan according to claim 20 wherein the at least one handle comprises a U-shaped handle attached to one side of the pan and further comprising a second U-shaped handle attached to the opposite side of the pan.

22. A grilling pan according to claim 12 further comprising a pouring spout formed said upright wall.

23. A grilling pan according to claim 12 wherein said apertures have a width of greater than about 1.5 mm and less than about 3 mm.

24. A grilling pan according to claim 12 wherein said apertures have a width of about 2.1 mm.

25. A grilling pan according to claim 12 further comprising one or more support ribs that extends below and are connected to the bottom of the pan traversing between the upright walls on opposite side of the pan.

26. A grill pan according to claim 12 having a rectangular shape.

27. A grill pan according to claim 12 having a circular shape.

28. A grill pan according to claim 12 having a non-stick coating on the upward facing portion of the cooking surface.

29. A grill pan according to claim 12 having a non-stick coating on the upward facing and downward facing portion of the cooking surface.

30. A grilling pan comprising:
a) a cooking surface, which comprises a first portion having;
  i) a first sequence of two or more elongated ribs,
  ii) a second a sequence of elongated ribs, wherein substantially all of the ribs in the first and second sequence are disposed between a rib in the other sequence,
b) a sequence of channels disposed between each of pair of adjacent elongated ribs of the first and second sequence, wherein at least a portion of said first sequence of supporting ribs comprise one or more slits disposed substantially upon the apex ribs and above the bottom of the adjacent channel, being oriented in the direction of the ribs,
c) a common channel at the periphery of said cooking surface disposed at an elevation to collect fat flowing down the sequence of channels,
d) a wall extending substantially upright from and surrounding said common channel
e) wherein at least a portion of the top surface of the first sequence of ribs are disposed below the top surface of two or more adjacent ribs of the second sequence of supporting ribs.

31. A grilling pan according to claim 30 in which at least one of the first and the second sequence of elongated ribs is disposed at an angle from the horizontal so as to define a first reference plane substantially parallel to a second reference plane defined by the bottom surface of the channels.

32. A grilling surface according to claim 30 wherein the difference in height between the ribs relative to the first reference plane is at least about 1 mm.

33. A grilling pan according to claim 32 wherein said slits have a width of greater than about 1.5 mm and less than about 3 mm.

34. A grilling pan according to claim 33 wherein said slits have a width of about 2.1 mm.

35. A grilling pan according to claim 32 wherein the apex of the rib at slit therein is at least 5 mm above the height of the immediately adjacent channel portion.

36. A grilling pan according to claim 30 wherein the slits have a width from about 1.5 mm to about 3 mm.

37. A grilling pan according to claim 30 wherein the slits have a width of about 2.1 mm.

38. A grilling pan according to claim 30 wherein at least a portion of the one or more of the slits have an aspect ratio greater than 1.

39. A grilling pan according to claim 30 in which said surrounding wall extends above the surface of the ribs.

40. A grilling pan according to claim 30 further comprising at least one handle attached to and extending outward from said upright wall.

41. A grilling pan according to claim 30 further comprising a pouring spout formed at said upright wall.

42. A grilling pan according to claim 30 wherein the spacing between adjacent ribs in the first and second set is about 24 mm.

43. A grilling pan according to claim 30 wherein the slits terminate at least 1 inch distal from the surrounding channel.

44. A grilling pan according to claim 32 wherein the apex of the rib at the slit thereon is at least 3 mm above the height of the immediately adjacent channel portion.

45. A grilling surface according to claim 30 wherein the difference in height between the ribs relative to the first reference plane is at least about 2 mm.

\* \* \* \* \*